(12) United States Patent
Turk et al.

(10) Patent No.: US 10,881,250 B2
(45) Date of Patent: Jan. 5, 2021

(54) LIQUID COLLECTING CUTTING BOARD

(71) Applicants: Steven Turk, Millis, MA (US); Gary Turk, Millis, MA (US)

(72) Inventors: Steven Turk, Millis, MA (US); Gary Turk, Millis, MA (US)

( * ) Notice: Subject to any disclaimer, the term of this patent is extended or adjusted under 35 U.S.C. 154(b) by 97 days.

(21) Appl. No.: 16/224,881

(22) Filed: Dec. 19, 2018

(65) Prior Publication Data

US 2020/0196802 A1    Jun. 25, 2020

(51) Int. Cl.
*A47J 47/00*      (2006.01)
*B25B 11/00*     (2006.01)

(52) U.S. Cl.
CPC .................. *A47J 47/005* (2013.01)

(58) Field of Classification Search
CPC ..................................... A47J 47/005
See application file for complete search history.

(56) References Cited

U.S. PATENT DOCUMENTS

| | | | |
|---|---|---|---|
| 3,598,164 A * | 8/1971 | August | A47J 47/005 269/13 |
| 4,653,737 A * | 3/1987 | Haskins | A47J 47/005 269/13 |
| 4,798,372 A | 1/1989 | Tingle | |
| 5,366,208 A | 11/1994 | Benjamin | |
| 5,527,022 A | 6/1996 | Gibson | |
| 5,865,105 A | 2/1999 | Epelanov | |
| 5,938,185 A * | 8/1999 | Kletter | A47J 47/005 269/15 |
| 6,386,531 B1 | 5/2002 | Prosser | |
| 6,536,753 B1 | 3/2003 | Keener | |
| D500,940 S * | 1/2005 | Goggin | D7/698 |
| 7,422,201 B2 * | 9/2008 | Pearl | A47J 47/005 269/289 R |
| 8,251,357 B2 | 8/2012 | Young | |
| D796,276 S | 9/2017 | King | |
| 2005/0040580 A1 * | 2/2005 | Davis | A47J 47/005 269/289 R |
| 2013/0256963 A1 | 10/2013 | Shofert | |

* cited by examiner

*Primary Examiner* — Lee D Wilson

(57) ABSTRACT

A liquid collecting cutting board for collecting liquids includes a cutting board having a top side, a bottom side, a front side, a rear side, a left side, and a right side. The top side has a pair of drain apertures extending through the bottom side. The pair of drain apertures is configured to allow a liquid to pass through from the top side of the cutting board. A plurality of feet is coupled to the bottom side of the cutting board. A collector is coupled to the bottom side of the cutting board beneath the pair of drain apertures. The collector is configured to collect the liquid that passes through the pair of drain apertures.

6 Claims, 5 Drawing Sheets

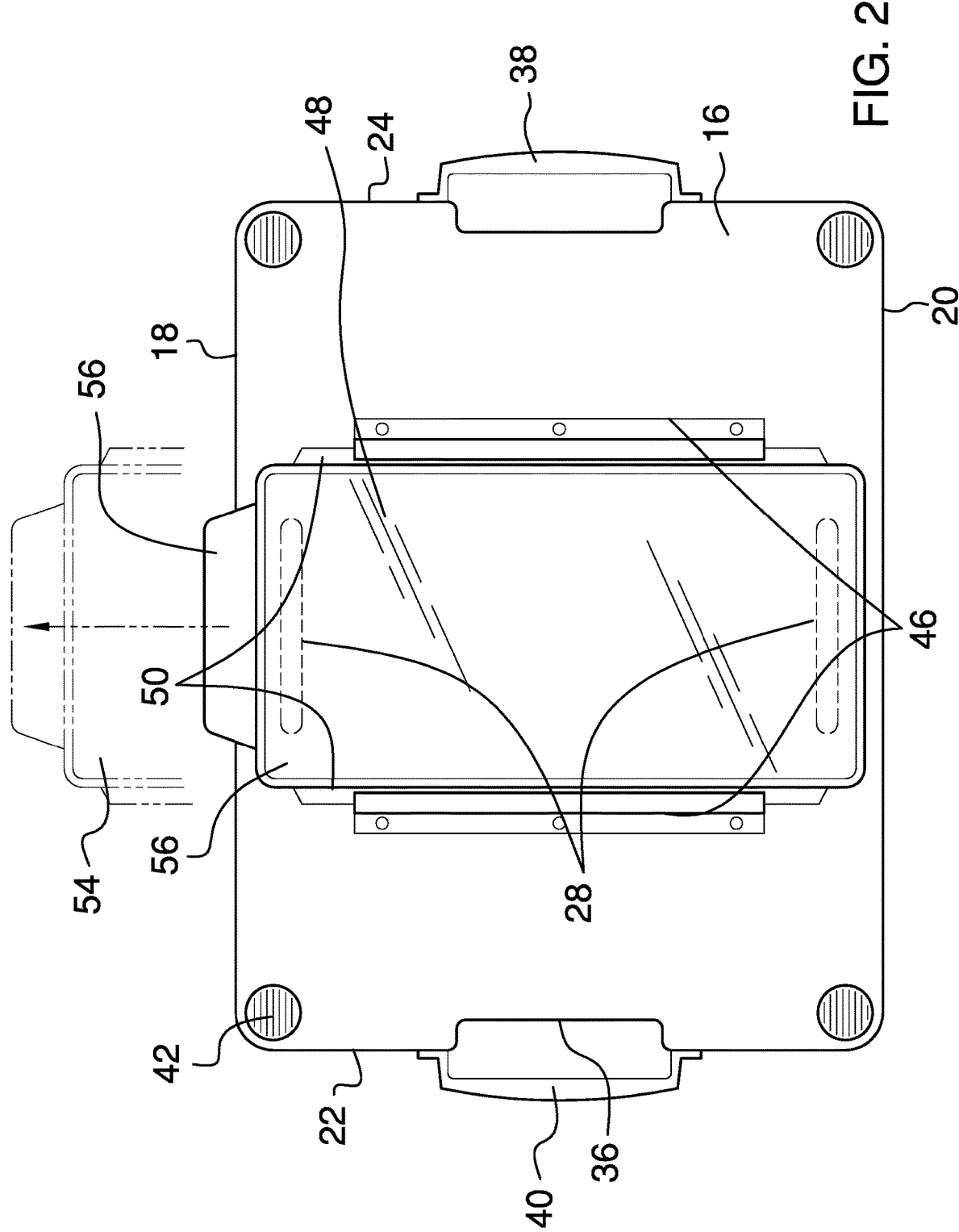

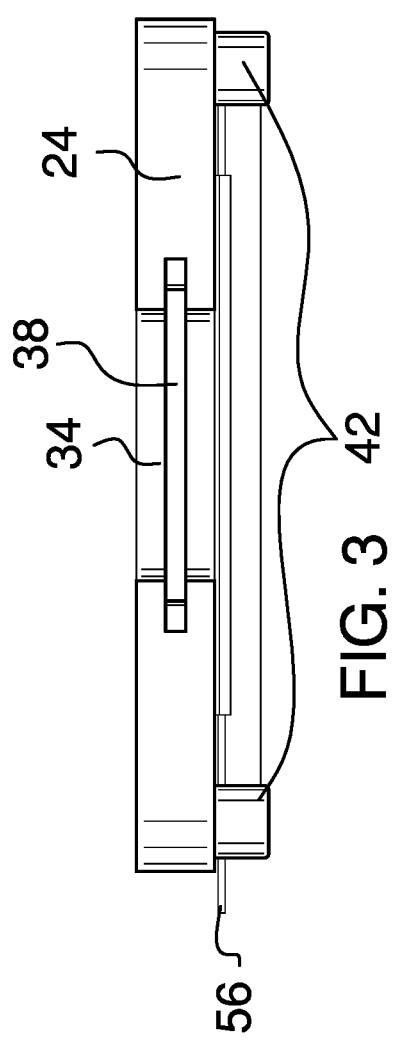
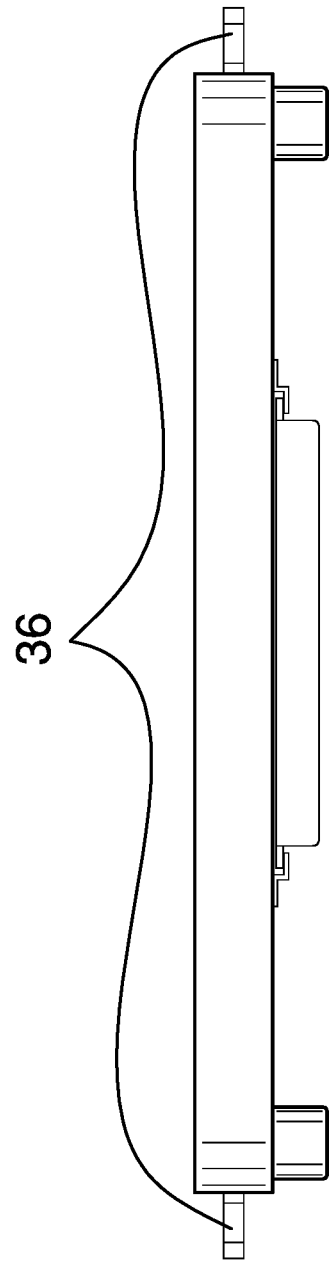

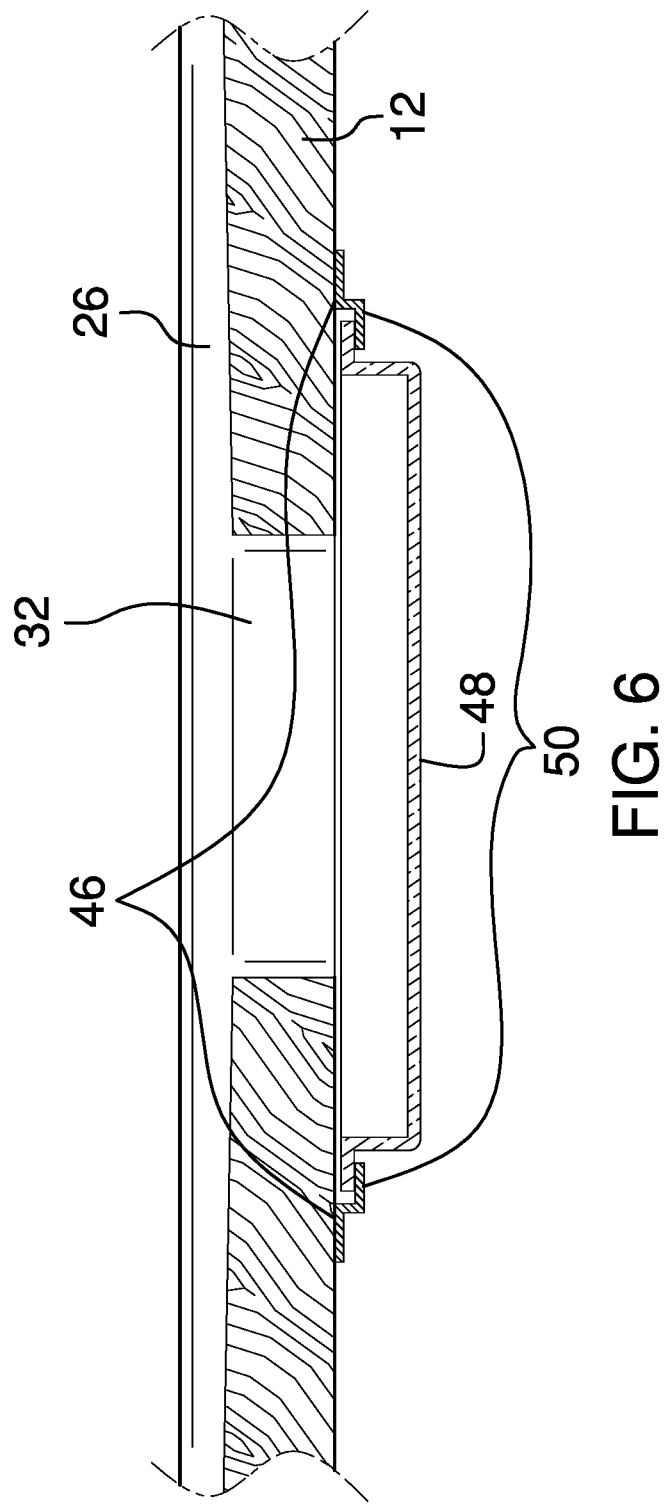

LIQUID COLLECTING CUTTING BOARD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cutting boards and more particularly pertains to a new cutting board for collecting liquids.

BRIEF SUMMARY OF THE INVENTION

An embodiment of the disclosure meets the needs presented above by generally comprising a cutting board having a top side, a bottom side, a front side, a rear side, a left side, and a right side. The top side has a pair of drain apertures extending through the bottom side. The pair of drain apertures is configured to allow a liquid to pass through from the top side of the cutting board. A plurality of feet is coupled to the bottom side of the cutting board. A collector is coupled to the bottom side of the cutting board beneath the pair of drain apertures. The collector is configured to collect the liquid that passes through the pair of drain apertures.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a bottom plan view of an embodiment of the disclosure.

FIG. 3 is a rear elevation view of an embodiment of the disclosure.

FIG. 4 is a side elevation view of an embodiment of the disclosure.

FIG. 6 is a cross-sectional view of an embodiment of the disclosure along line 6-6 of FIG. 5.

DETAILED DESCRIPTION OF THE INVENTION

Figure 1:
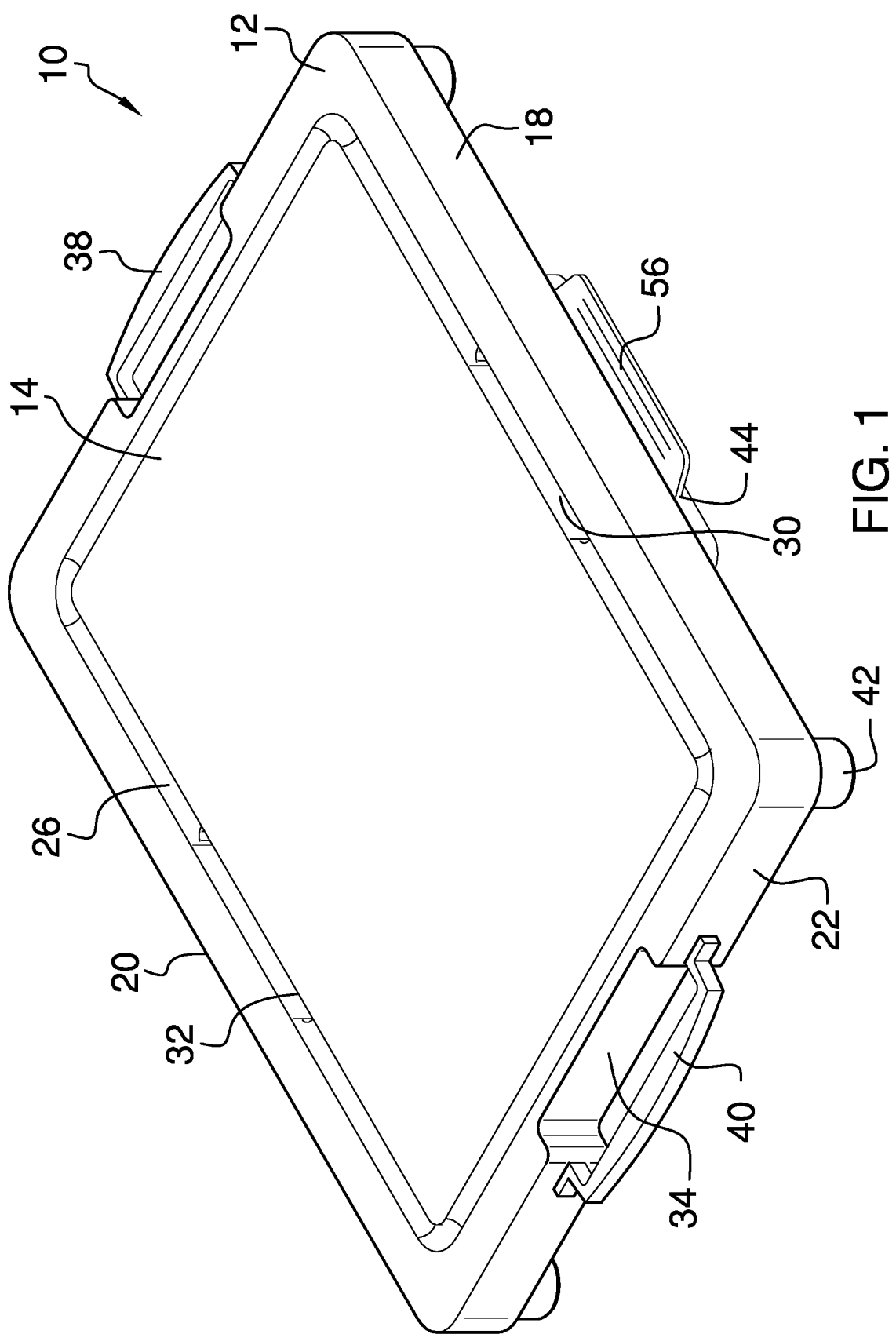
FIG. 1 is an isometric view of a liquid collecting cutting board according to an embodiment of the disclosure.
Figure 5:
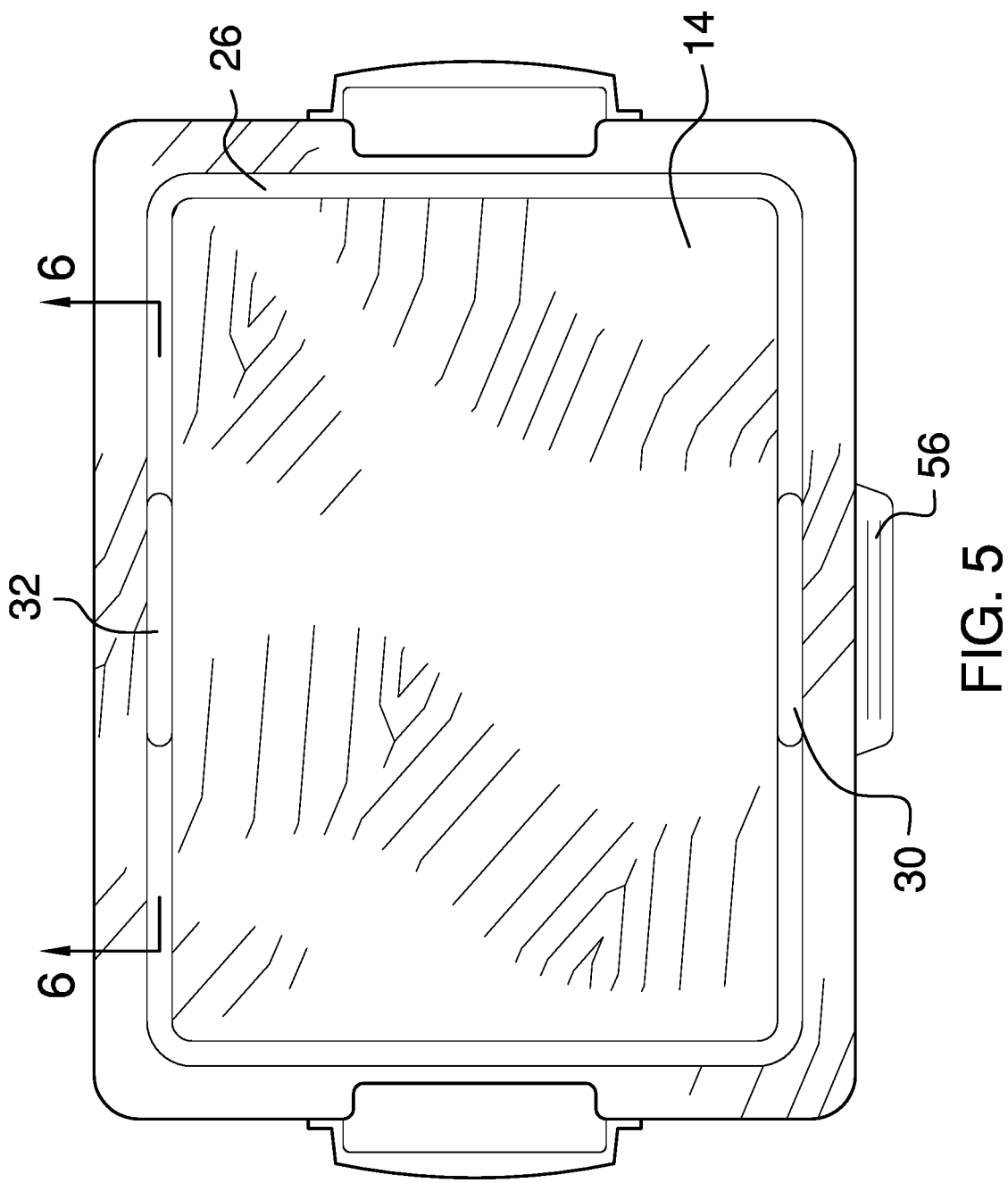
FIG. 5 is a top plan view of an embodiment of the disclosure.

With reference now to the drawings, and in particular to FIGS. 1 through 6 thereof, a new cutting board embodying the principles and concepts of an embodiment of the disclosure and generally designated by the reference numeral 10 will be described.

As best illustrated in FIGS. 1 through 6, the liquid collecting cutting board 10 generally comprises a cutting board 12 having a top side 14, a bottom side 16, a front side 18, a rear side 20, a left side 22, and a right side 24. The top side 14 has a channel 26 extending towards the bottom side 16. The channel 26 runs proximal each of the front side 18, the rear side 20, the left side 22, and the right side 24. The top side 14 has a pair of drain apertures 28 extending from within the channel 26 through the bottom side 16. Each of the pair of drain apertures 28 may be medially disposed between the left side 22 and the right side 24. The pair of drain apertures 28 comprises a front drain 30 proximal the front side 18 and a rear drain 32 proximal the rear side 20. The channel 26 is configured to collect and direct a liquid to the pair of drain apertures 28, preventing lost desirable juices and minimizing mess. The pair of drain apertures 28 is configured to allow the liquid to pass through from the top side 14 of the cutting board. Each of the right side 24 and the left side 22 of the cutting board may have a handle cutout 34. The handle cutout 34 of the right side 24 extends inward towards the left side 22 and the handle cutout 34 of the left side 22 extending inward towards the right side 24.

A pair of handles 36 is coupled to the cutting board 12. The pair of handles 36 comprises a right handle 38 and a left handle 40 coupled to the right side 24 and the left side 22 of the cutting board, respectively, adjacent the handle cutout 34. The handle cutout 34 allows a user to easily slide her hands between the cutting board 12 and each of the pair of handles 36. A plurality of feet 42 is coupled to the bottom side 16 of the cutting board to elevate the cutting board 12 above a surface on which it is placed.

A collector 44 comprises a pair of guides 46 and a collection tray 48. Each of the pair of guides 46 is coupled to the bottom side 16 of the cutting board. The pair of guides 46 may be disposed parallel to one another running from proximal the rear side 20 to proximal the front side 18. The collection tray 48 has a pair of lips 50. The pair of lips 50 is slidably engageable with the pair of guides 46. The collection tray 48 has a collect position 52 engaged with the pair of guides 46 underneath the pair of drain apertures 28 and an alternate removed position 54 separated from the pair of guides 46. The collection tray 48 in the collect position 52 is configured to collect the liquid that passes through the pair of drain apertures 28. There may be a tongue 56 coupled to the collection tray 48. The tongue 56 protrudes past the front side 18 of the cutting board when the collection tray 48 is in the collect position 52. The tongue 56 provides a gripping point from which to move the collection tray 48 from the collect position 52 to the alternate removed position 54.

In use, chopping or cutting food preparation is performed on the top side 14 of the cutting board with the collection tray 48 in the collect position 52. All liquid is pushed into the channel 26 and in turn passes through the pair of drain apertures 28 into the collection tray 48. When done, the collection tray 48 is then pulled to the alternate removed position 54 for the liquid to be utilized or disposed of.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A liquid collecting cutting board comprising:
   a cutting board, the cutting board having a top side, a bottom side, a front side, a rear side, a left side, and a right side, the top side having a pair of drain apertures extending through the bottom side, the pair of drain apertures being configured to allow a liquid to pass through from the top side of the cutting board, the top side of the cutting board having a channel extending towards the bottom side, the channel running proximal each of the front side, the left side, the rear side, and the right side, the pair of drain apertures extending through the channel, the channel being configured to direct the liquid to the pair of drain apertures;
   a plurality of feet coupled to the cutting board, the plurality of feet being coupled to the bottom side; and
   a collector coupled to the cutting board, the collector being coupled to the bottom side beneath the pair of drain apertures, the collector being configured to collect the liquid that passes through the pair of drain apertures, the collector comprising:
     a pair of guides coupled to the cutting board, each of the pair of guides being coupled to the bottom side, and
     a collection tray, the collection tray having a pair of lips, the pair of lips being slidably engageable with the pair of guides, the collection tray having a collect position engaged with the pair of guides underneath the pair of drain apertures and an alternate removed position separated from the pair of guides.

2. The liquid collecting cutting board of claim 1 further comprising a tongue coupled to the collection tray, the tongue protruding past the front side of the cutting board when the collection tray is in the collect position, the tongue providing a gripping point from which to move the collection tray from the collect position to the alternate removed position.

3. The liquid collecting cutting board of claim 1 further comprising a pair of handles coupled to the cutting board, the pair of handles comprising a right handle and a left handle coupled to the right side and the left side of the cutting board, respectively.

4. The liquid collecting cutting board of claim 1 further comprising each of the right side and the left side of the cutting board having a handle cutout, the handle cutout of the right side extending towards the left side adjacent the right handle, the handle cutout of the left side extending towards the right side adjacent the left handle.

5. The liquid collecting cutting board of claim 2 further comprising each of the pair of drain apertures being medially disposed between the left side and the right side, the pair of drain apertures comprising a front drain proximal the front side and a rear drain proximal the rear side.

6. A liquid collecting cutting board comprising:
   a cutting board, the cutting board having a top side, a bottom side, a front side, a rear side, a left side, and a right side, the top side having a channel extending towards the bottom side, the channel running proximal each of the front side, the left side, the rear side, and the right side, the top side having a pair of drain apertures extending from within the channel through the bottom side, each of the pair of drain apertures being medially disposed between the left side and the right side, the pair of drain apertures comprising a front drain proximal the front side and a rear drain proximal the rear side, the channel being configured to direct a liquid to the pair of drain apertures, the pair of drain apertures being configured to allow the liquid to pass through from the top side of the cutting board, each of the right side and the left side of the cutting board having a handle cutout, the handle cutout of the right side extending towards the left side, the handle cutout of the left side extending towards the right side;
   a pair of handles coupled to the cutting board, the pair of handles comprising a right handle and a left handle coupled to the right side and the left side of the cutting board, respectively, adjacent the handle cutout;
   a plurality of feet coupled to the cutting board, the plurality of feet being coupled to the bottom side; and
   a collector coupled to the cutting board, the collector comprising:
     a pair of guides coupled to the cutting board, each of the pair of guides being coupled to the bottom side;
     a collection tray, the collection tray having a pair of lips, the pair of lips being slidably engageable with the pair of guides, the collection tray having a collect position engaged with the pair of guides underneath the pair of drain apertures and an alternate removed position separated from the pair of guides, the collection tray in the collect position being configured to collect the liquid that passes through the pair of drain apertures; and
     a tongue coupled to the collection tray, the tongue protruding past the front side of the cutting board when the collection tray is in the collect position, the tongue providing a gripping point from which to move the collection tray from the collect position to the alternate removed position.

* * * * *